Patented Aug. 18, 1942

2,293,466

UNITED STATES PATENT OFFICE 2,293,466

METHOD OF MAKING GREASEPROOF CELLULOSIC SHEET MATERIAL

James G. Juhasz, Chicago, Ill., assignor to Maurice J. Wright, Chicago, Ill.

No Drawing. Application July 10, 1939, Serial No. 283,649

1 Claim. (Cl. 92—21)

The invention relates to cellulose sheet material and to a method of making the same. More particularly it relates to treated paper which is grease-proof and water resistant.

Heretofore many and various attempts have been made to render paper grease-proof by coating or impregnating the paper with various materials. For example, proteins, waxes, resins, rubber, etc., have been tried, but have been found unsatisfactory in some way or other as for instance from the point of view of cost or else the coatings dry out or crack or do not adhere to the surfaces sufficiently well. When casein is employed, it becomes brittle on aging and cracks when the moisture dries out. The same faults occur with other materials which may be made into aqueous solution and used for coating purposes. The addition of glycerin to such materials is not satisfactory as it sweats out and ceases to act as a plasticizer.

In accordance with the present invention paper is grease-proofed with a vegetable mucilage. The vegetable mucilage contemplated is a product obtainable by extraction from seeds. The preferred vegetable mucilage for use in the practice of this invention is flaxseed (linseed) mucilage. Flaxseed mucilage, according to Ernest Anderson, J. Biol. Chem., vol. 100, page 249 (1933) consists of d-galacturonic acid combined with l-rhamnose which in turn is combined with d-xylose and l-galactose. Other mucilages derived from plants of the Salvia family may be used, as for example, quinceseed. Also mucilages from plants of the Plantago family such as psyllium seed may be used. Mucilages from other plants such as okra and rye are contemplated.

The term mucilage as used in this specification and claims is intended to cover both liquid mucilage and the dry or substantially dry evaporation residuum of the liquid mucilage.

The vegetable mucilage may be distributed in or on the paper by coating or impregnating the paper sheets or by incorporating the vegetable mucilage with the wood pulp in the beater and then forming the mixture into sheets in the usual manner for making paper.

Paper coated or impregnated with a composition consisting of vegetable mucilage of the general type of flaxseed mucilage is grease-proof and flexible. When stored in any humidity or any atmospheric condition it will remain flexible and not become tacky. There is no need for the use of glycerin or other foreign hygroscopic substance in the vegetable mucilage as without such substance it will retain its flexibility to the point that paper coated or impregnated with it may be used successfully in modern packaging machines.

While the vegetable mucilage in its substantially pure state may be used for rendering paper grease-proof, it is preferred to use the vegetable mucilage in mixture with substances which can be dissolved in aqueous solution and then later rendered water insoluble. The preferred substance of this type is casein. This may be dissolved in alkaline solution, intermixed with the vegetable mucilage, applied to the paper or other material and rendered insoluble by the addition of an astringent. Another suitable material of this type is shellac which may be dissolved in a solution of weak alkali such as borax and rendered insoluble by means of an astringent. Likewise gelatin may be dissolved in hot aqueous solution and rendered insoluble by means of a tanning agent such as formaldehyde or the like.

Paper coated with the above compositions containing vegetable mucilage and water insolubilized material has the advantage of not only being grease-proof and flexible but also has high wet strength. By the use of astringents the sheets may be made water resistant and permanent to the extent that they will withstand boiling in water as a means of sterilization. They will remain flexible when stored in any humidity and under any atmospheric condition, and will not become tacky.

The vegetable mucilages of the flaxseed type are light colored, unless contaminated with dark colored impurities. Pure light colored vegetable mucilage alone or mixed with pure casein or gelatin will reduce the opacity of lighter weight papers fifteen percent or more, thereby making wrapped products more visible.

In addition to the use of casein or like materials which may be dissolved in aqueous solution and rendered insoluble, I may also incorporate with the vegetable mucilage various other materials. Starch is one of the ingredients which is used in the preferred formula, and is particularly important when the paper treating composition is added to the wood pulp in the beater.

The proportions of the various ingredients may be varied widely according to the use of the composition. For preparing grease-proof flexible sheets of paper, the only essential ingredient is the vegetable mucilage. The vegetable mucilage may be applied to the paper in any suitable manner in the form of a water extract of the solid mucilage in a concentration of, for example 1% to 50% by weight, a suitable coating composition containing 25 parts by weight of the dry mucilage to 75 parts by weight of water.

For the preparation of grease-proof water resistant flexible sheets the vegetable mucilage is used in combination with casein, gelatin, shellac or similar substance which may be dissolved in an aqueous solution and then rendered insoluble.

The proportions of the vegetable mucilage to casein or like material will vary to some extent, depending upon whether the composition is applied to the wood pulp in the beater or applied to the paper by a tub sizing or other coating process. Table I given below gives the proportions of the various constituents on a dry basis for paper coating. The insolubilizing agent such as formaldehyde, alum or the like, is not included in the table. It is present in only very small amount, generally chemically combined with the casein or like material in the case of the finished grease-proofed and water resistant paper.

*Table I*

|  | Preferred | Range |
|---|---|---|
|  | Parts by weight | Parts by weight |
| Mucilage (dry) | 80 | 10-90 |
| Casein, gelatin or shellac | 10 | 90-10 |
| Starch | 8 | 0-10 |
| Shellac | 2 | 0-5 |

The following Table II gives the proportions of the vegetable mucilage to casein and like material, together with starch, when the grease-proof water resistant paper is made by incorporating the composition with the wood pulp in the beater.

*Table II*

|  | Preferred | Range |
|---|---|---|
|  | Parts by weight | Parts by weight |
| Mucilage (dry) | 45 | 10-70 |
| Casein, gelatin or shellac | 10 | 10-70 |
| Starch | 45 | 20-45 |

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

*Example I (Paper coating)*

(A) One (1) pound of casein was dissolved in 32 oz. of water heated to 180° F., which had been saturated with 1½ oz. of ammonium carbonate. This mixture was stirred slowly until same became a rubberlike mass.

(B) One-half (½) pound of flaxseed (whole) was washed thoroughly in running water until all foreign particles were removed. 64 oz. or one-half gallon water was brought to 210° F., then washed flaxseed added and the mixture stirred occasionally for four to six hours until all mucilage and water solvent fats were dispelled. This mixture was strained at highest temperature.

(C) One (1) pound of potato starch was mixed in one gallon of water.

(D) One and one-half (1½) oz. sodium or potassium hydroxide was dissolved in 16 oz. of water and allowed to cool. This solution was mixed with the composition obtained in C at a continuous stir until the mixture formed a heavy glassylike translucent substance, designated as I.

(E) Five (5) oz. natural or bleached shellac was dissolved in near boiling water (190° F.), which had been saturated with one (1) oz. of borax. This mixture was stirred continually until shellac was completely dissolved.

To solution A as produced in full volume was added B to make one gallon, at moderate temperature, and this stirred until a perfect emulsion was produced. Then 8 to 16 oz. of solution I was added and the compound allowed to cool to 60° F. One dram of formaldehyde was added to this compound as a preservant and viscosity control. Should the compound in this state not suit the particular operation, the consistency and viscosity of the compound may be altered to the required needs by addition of formaldehyde. However, not more than 6 drams of formaldehyde should be added to one gallon of compound for satisfactory results. The compound after being thoroughly mixed should be allowed to stand for 12 hours before using.

The above described compound may be applied to a sheet of paper by any suitable means such as immersion or surface coating, and will produce a greaseproof and water repellent sheet. However, if greater water repellency is required, add one (1) to five (5) oz. of solution E per gallon of compound, the addition of over five (5) ozs. is not advisable as it will cause the sheet to lose its flexibility. With the addition of solution E the compound should be used within 12 hours after mixing.

The above described compound applied to a sheet of paper may be rendered free of bacteria, sterile and insoluble to the extent that after a hot water rinse the sheet becomes odorless and tasteless. For this purpose any of the chemicals known as astringents may be used, preferably potassium aluminum sulphate. To obtain satisfactory results four (4) oz. potassium aluminum sulphate was dissolved in one gallon of water; however, this procedure may be altered to fit the available mechanical operation.

The vegetable mucilage composition of this invention may be applied to any type of paper, including glassine paper, wrapping paper, high grade rag or linen paper, or any of the special high porous absorbent papers used for impregnation. Preferably the composition is applied so that it is uniformly distributed throughout the paper, as well as on the surface as it has been discovered that the vegetable mucilage has a similar action to glycerine in rendering paper or other cellulosic material soft and flexible.

*Example II (Beater process)*

Flaxseed mucilage consisting of a 10% aqueous solution of the solid mucilage was mixed with a 10% aqueous solution of potato starch to form an aqueous solution consisting of one-half starch and one-half mucilage. To this solution was added a 10% solution of casein in ammonium carbonate in sufficient amount to give a composition having the formula shown in column 1 of Table II. A beater of the type used in the paper industry was charged with wood pulp and the pulp beaten until sufficiently hydrated for sheet formation. To the pulp was then added the flaxseed mucilage composition described above in amount equal to about 20% of the liquid composition based on the weight of the fibre and the mixture beaten until the flaxseed composition and the pulp are intimately mixed. The mixture was then poured on a screen and formed into a sheet. The sheet while still wet was removed from the screen and immersed in a bath of alum and then washed and dried. The sheet of paper formed as above was greaseproof and water resistant after bending.

While there have been shown and described certain embodiments of the invention, it is to be understood that it is capable of many modifications. Changes, therefore, may be made without departing from the spirit and scope of the invention as described in the appended claim, in which it is the intention to claim all novelty inherent in the invention as broadly as possible, in view of the prior art.

The term astringent includes such materials as alum, tannin, silver nitrate, zinc sulfate, ferric chloride, chrome alum, and the like. These materials in general act as tanning agents for proteins and form water insoluble reaction products with casein and shellac.

I claim:

The method which comprises intermixing a composition of flaxseed mucilage and water soluble caseinate with an aqueous dispersion of cellulose pulp, forming the mixture into a sheet, and applying an astringent to the sheet to render the casein insoluble in water.

JAMES G. JUHASZ.